United States Patent [19]

Abe

[11] 4,285,511
[45] Aug. 25, 1981

[54] METHOD AND APPARATUS FOR STACKING SHEETS SUCH AS PAPER CURRENCY

[75] Inventor: Masahiro Abe, Kawaguchi, Japan

[73] Assignee: Glory Kogyo Kabushiki Kaisha, Himeji, Japan

[21] Appl. No.: 158,087

[22] Filed: Jun. 10, 1980

[30] Foreign Application Priority Data

Jun. 14, 1979 [JP] Japan .................................. 54-75417

[51] Int. Cl.³ ............................................. B65H 29/40
[52] U.S. Cl. .................................... 271/178; 271/189; 271/212; 271/215
[58] Field of Search ............... 271/177, 178, 189, 212, 271/213, 214, 220, 224, 215; 226/186

[56] References Cited

U.S. PATENT DOCUMENTS 3,411,686  11/1968  Bender ............................ 226/186 X

OTHER PUBLICATIONS

IBM Technical Disclosure Bulletin, vol. 17, No. 5, p. 1308, Oct. 1974, "Paper Bin", J. A. Craft.

*Primary Examiner*—Richard A. Schacher
*Attorney, Agent, or Firm*—Beveridge, DeGrandi, Kline & Lunsford

[57] ABSTRACT

A plurality of coplanar belt conveyors extend in parallel spaced relationship to each other to feed successive sheets to be stacked into a stacking compartment formed on the conveyors. Just upstream of the stacking compartment, one or more endless belts are loosely engaged about pulleys so as to provide free, deformable loops normally lying crosswise with the belt conveyors. Pressed by each sheet being transported by the belt conveyors, the free belt loops engage the upstream edge of an existing stack of sheets in the stacking compartment and raise same away from the conveyors, thereby permitting the new sheet to be fed under the existing sheet stack. The free belt loops can be subsequently withdrawn from between the sheet stack and the new sheet as the belts are revolved about the pulleys in a specific direction. In another embodiment the belts are nonrotatably supported, and a pullout rod extends through their free loops. The free belt loops are withdrawn from between the sheet stack and each new sheet in the stacking compartment upon movement of the pullout rod away from the belt conveyors.

9 Claims, 5 Drawing Figures

METHOD AND APPARATUS FOR STACKING SHEETS SUCH AS PAPER CURRENCY

BACKGROUND OF THE INVENTION

The present invention relates to a method of, and apparatus for, stacking paper currency, cards, printed sheets, etc., as they are supplied one by one. In the following disclosure and in the claims appended hereto the term "sheet" will be used to denote all such sheets of paper or other material that can be handled by the method and apparatus of the invention.

In banks and like monetary establishments, for example, the need exists for transporting a succession of bills, either after or while being counted, along a prescribed path and for stacking them in a delivery station, for easy extraction by bank personnel or customers. A variety of other industrial and commercial establishments have a need for similarly handling printed sheets, various types of cards, and other sheets.

U.S. Pat. No. 3,214,096, "Paper Currency Counter", issued to A. R. Buchholz et al. on Oct. 26, 1965, discloses a typical conventional example of sheet stacking means as incorporated in a paper currency counting machine. The bill stacking means according to Buchholz et al. include a plurality of endless belts to carry bills upwardly from an arcuate runway to a delivery compartment, the belts being maintained vertically at the level of the delivery compartment. The bills are assisted upwardly and moved longitudinally away from the belts by a plurality of spoked wheels mounted on a common drive shaft. The spokes of the wheels project through slots in the end of the bottom of the delivery compartment and engage the bottom edge of the bills to move them upwardly and away from the belts.

A problem with this known sheet stacking device is that the spoked wheels may fail to correctly engage the trailing edge of a bill being fed into the delivery compartment, leaving the trailing edge of the bill close to the belts in the delivery compartment. Should this happen, the leading edge of the next bill will strike against the trailing edge of the preceding bill in the delivery compartment. The result, of course, will be the jamming of the bills at the entrance to the delivery compartment.

SUMMARY OF THE INVENTION

This invention seeks to provide an improved method of, and apparatus for, stacking sheets as they are fed one by one and with spacings therebetween along a specific path, without the possibility of jamming of the sheets.

In summary the invention features the use of at least one belt of comparatively pliant material disposed immediately upstream of a stacking compartment formed on the prescribed path of travel of successive sheets. The belt is supported at a fixed point on the same side of the specific path as the stacking compartment so as to form a freely deformable loop normally crossing the specific path. When pressed by each sheet being fed along the specific path, the free belt loop intrudes into the stacking compartment and engages the upstream edge of a stack of sheets formed therein, further moving the upstream edge of the sheet stack away from the specific path. Each new sheet can thus be fed to a position between the specific path and the existing stack of sheets in the stacking compartment.

In some preferred embodiments disclosed herein, the belt takes the form of an endless belt, which is loosely engaged about a pulley mounted at the noted fixed point. The endless belt is rotated in a prescribed direction for withdrawal of its free loop from between the sheet stack and each new sheet fed into the stacking compartment.

Thus the looped belt in accordance with the invention is an excellent substitute for the conventional spoked wheels, totally eliminating the likelihood of jamming of sheets as they are stacked. Two or more such looped belts may be employed in juxtaposition, as required by the size, pliancy and other physical properties of sheets to be handled.

The above and other features and advantages of this invention will become more apparent from a study of the following detailed description, taken in connection with the attached drawings showing some preferable embodiments of the invention.

DETAILED DESCRIPTION OF THE INVENTION

Figure 1:
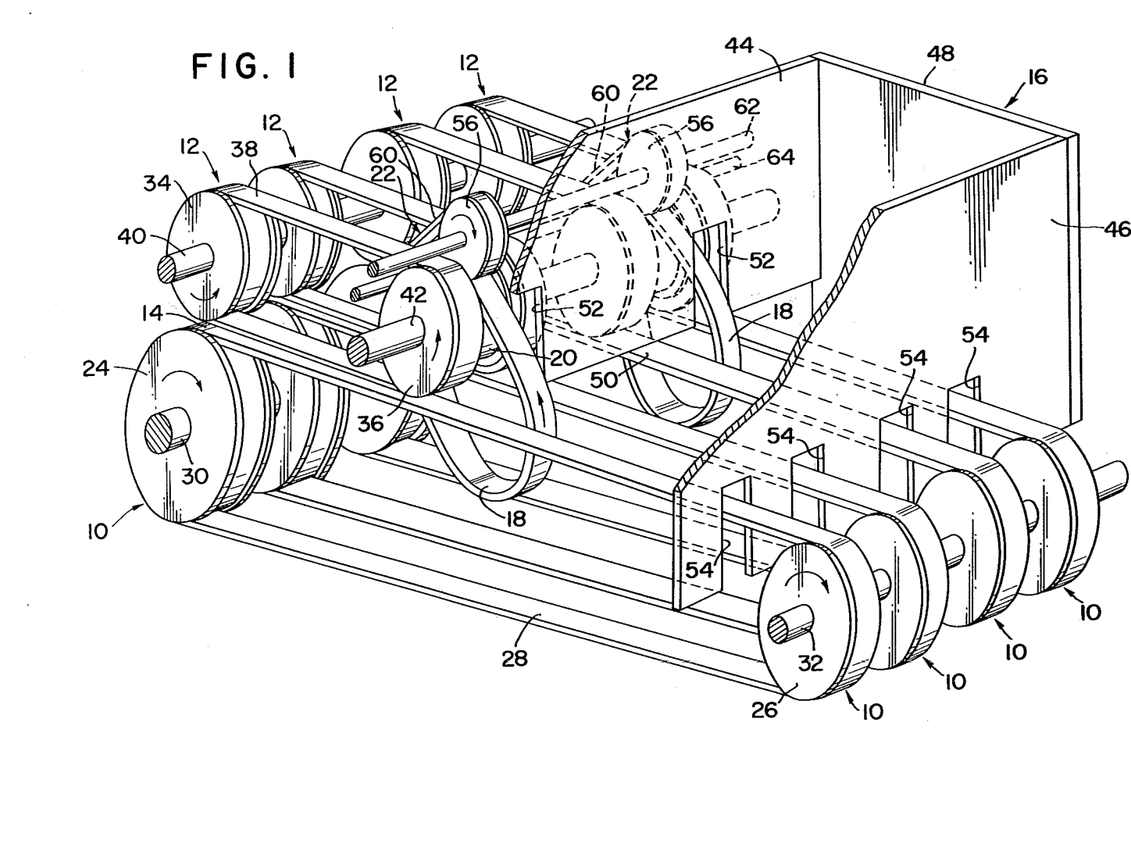
FIG. 1 is a perspective view, partly broken away for clarity, of a preferred form of the sheet stacking apparatus in accordance with the present invention.

The present invention is perhaps best embodied in the apparatus of FIG. 1, which is suitable for stacking bills or similar sheets of paper or other material. The sheet stacking apparatus broadly comprises:

1. a plurality of (four in the illustrated embodiment) belt conveyors 10 of identical make extending horizontally and in side-by-side, coplanar relationship to each other;

2. a plurality of presser belt assemblies 12 of identical make disposed one over each belt conveyor 10 and coacting therewith to feed successive sheets to be stacked, not shown in FIG. 1, along a prescribed path 14 extending horizontally;

3. a stacking compartment 16 formed on the upper side of the specific path 14, on or adjacent the downstream ends of the belt conveyors 10, for receiving the successive sheets fed along the path and for holding them in the form of a stack;

4. one or more (two in the illustrated embodiment) endless belts 18 lying immediately upstream of the stacking component 16 and loosely engaged about respective pulleys 20 rotatably supported on the upper side of the specific path 14; and 5. a drive belt assembly 22 coacting with each pulley 20 to impart rotation to the corresponding one of the endless belts 18.

Each belt conveyor 10 comprises a drive pulley 24, an idler pulley 26, and an endless belt 28 extending around the pulleys 24 and 26. The drive pulleys 24 of all the belt conveyors 10 are fixedly mounted on a common drive shaft 30 and axially spaced from each other. The idler pulleys 26 of all the belt conveyors 10 are fixedly mounted on a common idler shaft 32 and likewise axially spaced from each other. The drive shaft 30 is coupled to a motor drive unit (not shown) and thereby rotated in the clockwise direction as viewed in FIGS. 1 and 2A through 2G. Extending in parallel spaced relationship to each other, the upper flights or spans of the endless belts 28 lie in a horizontal plane forming the specific sheet path 14.

Each presser belt assembly 12 comprises first and second idler pulleys 34 and 36 and an endless belt 38 extending around them. The first idler pulleys 34 of all the presser belt assemblies 12 are fixedly mounted on a common, rotatable shaft 40 disposed horizontally in vertically spaced, parallel relationship to the drive shaft 30 of the belt conveyors 10. The second idler pulleys 36 of all the presser belt assemblies 12 are fixedly mounted on another common, rotatable shaft 42 disposed horizontally intermediate the extremities of the belt conveyors 10.

Held against the respective belts 28 of the belt conveyors 10, the belts 38 of the presser belt assemblies 12 jointly revolve in the counterclockwise direction. As the name implies, the pressure belt assemblies 12 function to press the successive sheets against the belt conveyors 10. The sheets are to be fed one by one, with appropriate spacings therebetween, into the horizontal path 14 between the belt conveyors 10 and the presser belt assemblies 12, by means falling outside the purview of this invention, and to be transported into the stacking compartment 16 in horizontal disposition.

The stacking compartment 16 lies downstream of the presser belt assemblies 12 and over the extensions of the belt conveyors 10. Generally of boxlike configuration, the stacking compartment 16 comprises a front or upstream wall 44, a rear or downstream wall 46, and a pair of side walls 48 (one shown). The horizontal sectional area of the space bounded by these walls 44, 46 and 48 is slightly greater than the maximum size of sheets to be stacked by the apparatus.

The bottom edge of the front wall 44 of the stacking compartment 16 lies above the upper flights or spans of the conveyor belts 28, with a spacing therebetween greater than the maximum thickness of each sheet to be handled by the apparatus. A sheet entrance 50 is thus formed for the entrance of successive sheets into the stacking compartment 16. The front wall 44 has two slots 52 extending upwardly from its bottom edge to permit intrusion of the endless belts 18 into the stacking compartment 16 for purposes hereinafter set forth.

The rear wall 46 of the stacking compartment 16 extends downwardly beyond the level of the bottom edge of the front wall 44. A plurality of slots 54 extend upwardly from the bottom edge of the rear wall 46 to receive the respective upper flights or spans of the conveyor belts 28 with clearance. Thus crossing the upper flights of the conveyor belts 28, the rear wall 46 serves as an abutment or stop for arresting the travel of the successive sheets as they are fed fully into the stacking compartment 16. The conveyor belts 28 support the stack of sheets in the stacking compartment 16.

Disposed just upstream of the stacking compartment 16, the two endless belts 18 can be of the type known as flat belts and preferably are fabricated from polyurethane rubber or like material. As will become better understood from the subsequent description of operation, a certain degree of pliancy is one of the most important physical properties that must be possessed by the endless belts 18 for the fulfillment of their intended functions.

The endless belts 18 are very loosely wrapped around the respective pulleys 20 rotatably mounted on the rotatable shaft 42 supporting the second idler pulleys 36 of the presser belt assemblies 12. Each pulley 20 is sandwiched between two adjacent second idler pulleys 36 fixedly mounted on the shaft 42 and is thereby restrained from axial displacement. Thus suspended from the pulleys 20, the endless belts 18 provide free, deformable loops normally crossing the specific sheet path 14 and each loosely interposed between two adjacent conveyor belts 28.

The endless belts 18 are in horizontal register with the slots 52 in the front wall 44 of the stacking compartment 16. When urged by each sheet traveling along the feed path 14, therefore, the free loops of the endless belts 18 intrude into stacking compartment 16 through the respective slots 52 to raise the upstream edge of the stack of sheets therein and thus to permit the incoming sheet to place itself under the sheet stack.

For the withdrawal of the free belt loops from within the stacking compartment 16 following the placement of each new sheet under the stack, there are provided the drive belt assemblies 22 associated with the respective endless belts 18. As will be seen also from FIG. 2A, each drive belt assembly 22 comprises a drive pulley 56, an idler pulley 58, and an endless belt 60 extending around the pulleys 56 and 58. The drive pulleys 56 of the two drive belt assemblies 22 are fixedly mounted on a common drive shaft 62, and the idler pulleys 58 are fixedly mounted on a common idler shaft 64. The drive shaft 62 is coupled to a motor drive unit (not shown) and thereby rotated in the clockwise direction.

The drive belts 60 urge the endless belts 18 against the pulleys 20, respectively, and so coact therewith to frictionally impart rotation to the endless belts 18 in the counterclockwise direction. The peripheral speed of rotation of the endless belts 18 should be approximately equal to the traveling speed of sheets along the path 14, for a purpose to be set forth presently.

The following is the operational description of the sheet stacking apparatus of FIG. 1, with reference had to FIGS. 2A through 2G. Such description will serve also to disclose the sheet stacking method of this invention.

Figure 2A:
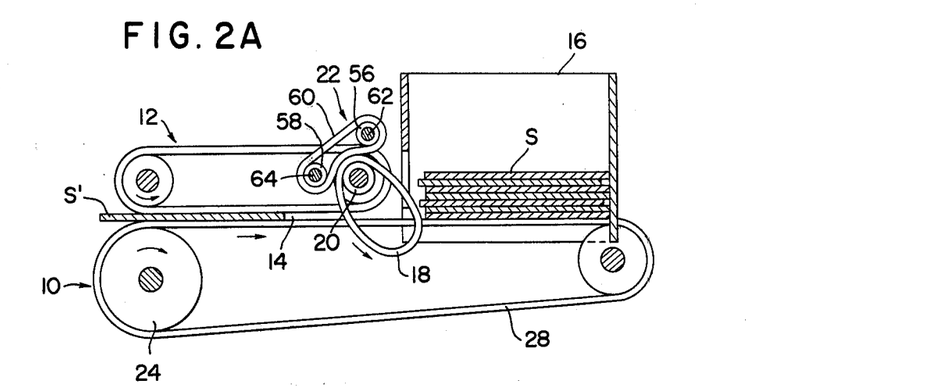
FIGS. 2A through 2G are a series of vertical sectional views of the sheet stacking apparatus of FIG. 1, the views being illustrative of sequential steps in the operation of the apparatus.

This operational description presupposes that some stack of sheets S has already been formed in the stacking compartment 16, as shown in FIGS. 2A through 2G. FIG. 2A shows an additional sheet S' just supplied to the path 14 between the belt conveyors 10 and the presser belt assemblies 12. The drive pulleys 24 of the belt conveyors 10 are in clockwise rotation, so that the sheet S' travels rightward on the belt conveyors while being pressed against the same by the presser belt assemblies 12. The endless belts 18 may be in a continuous rotation or may be set into rotation each time a new sheet approaches the stacking compartment 16.

Figure 2B:
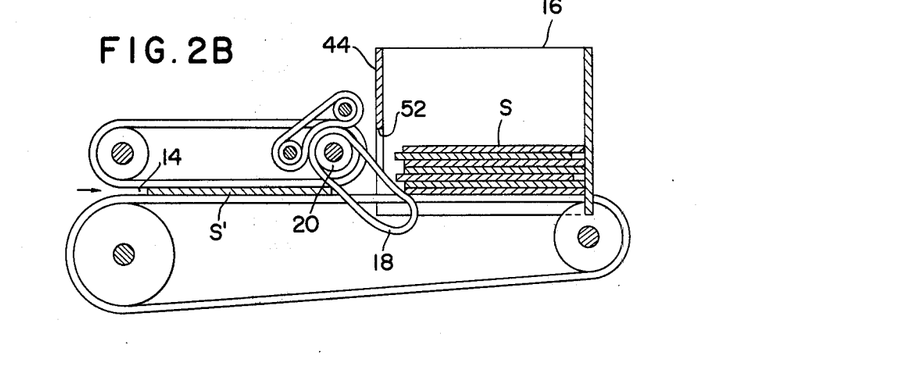
Figure 2C:
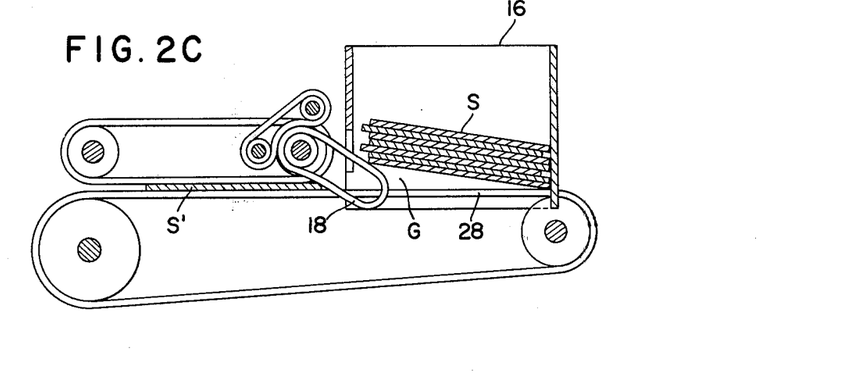

As shown in FIG. 2B, the sheet S' traveling along the path 14 comes into abutment against the free loops of the endless belts 18 crossing the path. The sheet S' proceeds to swing the free belt loops in the counterclockwise direction about the pulleys 20. Thus the free belt loops intrude into the stacking compartment 16 through the respective slots 52 in its front wall 44, until the loops engage the bottom, upstream edge of the stack of sheets S already formed in the stacking compartment.

With the continued travel of the sheet S' toward the stacking compartment 16, the free belt loops continue to turn counterclockwise, while undergoing deformation under the weight of the sheet stack S. Finally, however, the free belt loops raise the upstream side of the sheet stack S off the conveyor belt portions forming the bottom of the stacking compartment 16, as pictured in FIG. 2C. A gap G is thus created between the sheet stack S and the conveyor belts 28.

Figure 2D:
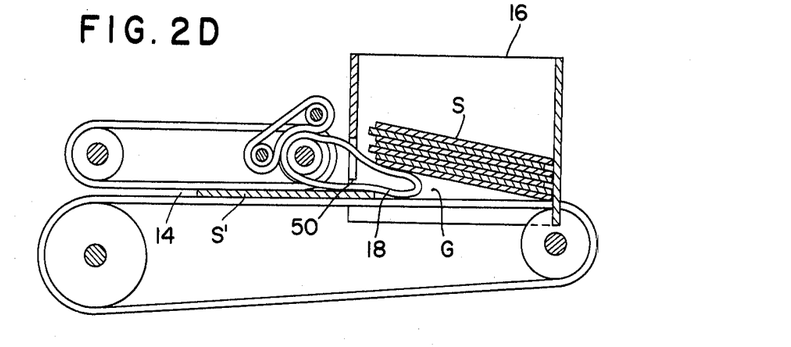

FIG. 2D shows the sheet S' subsequently traveling through the sheet entrance 50 into the gap G created as described above under the sheet stack S. Since the sheet S' moves under the free belt loops lifting the upstream side of the sheet stack S, there is absolutely no possibility of the sheet colliding with the sheet stack and so causing jamming at the sheet entrance 50. As has been mentioned, the peripheral speed of rotation of the endless belts 18 is set approximately equal to the traveling speed of the sheet along the path 14, so that there is substantially no relative motion between the free belt loops and the sheet S' traveling thereunder. Thus, with no frictional drag exerted thereon by the free belt loops, the sheet S' will move smoothly into the stacking compartment 16, even if the sheet is in the form of a much used and worn bill.

Figure 2E:
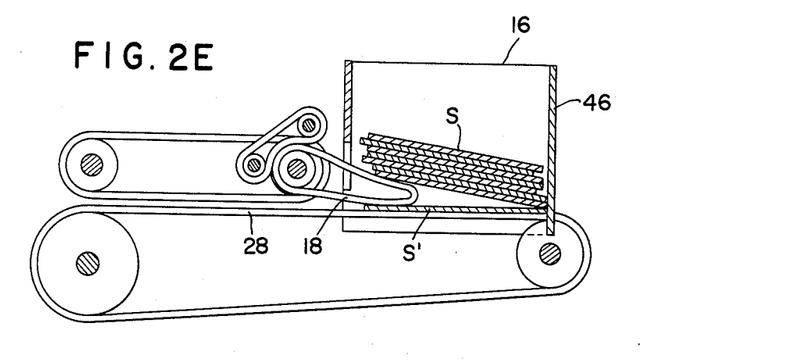

In FIG. 2E is shown the sheet S' fed fully into the stacking compartment 16. In spite of the continued rotation of the conveyor gelts 28 the sheet S' is held at a standstill with its leading edge in abutment against the rear wall 46 of the stacking compartment 16. The free belt loops are still caught between the raised sheet stack S and the newly introduced S' and are in continued rotation in the counterclockwise direction.

Figure 2F:
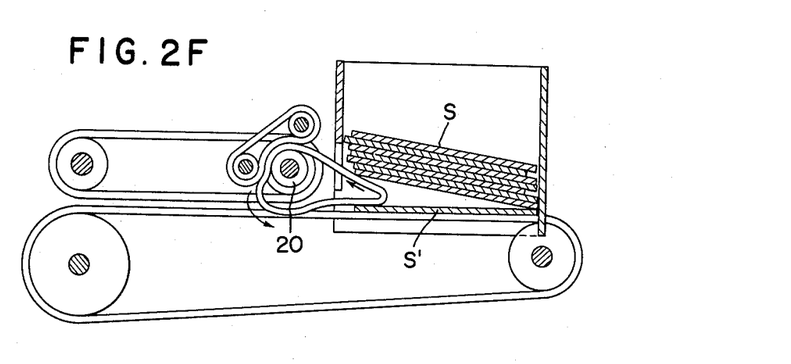

With reference to FIG. 2F the pulleys 20 pull those parts of the endless belts 18 which are in contact with the sheet stack S, so that these parts move toward the pulleys in sliding contact with the raised sheet stack. Those endless belt parts which are in contact with the sheet S', on the other hand, do not slide over the sheet, because the belt portions between these parts and the pulleys 20 deflect as shown. Thus the free belt loops gradually escape from between the sheet stack S and the new sheet S'.

Figure 2G:
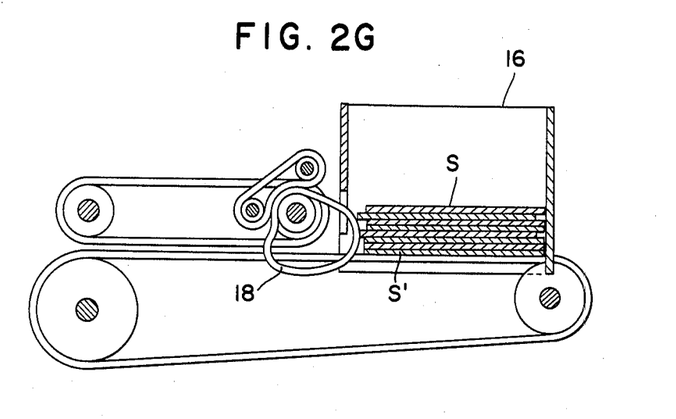

FIG. 2G shows the free belt loops just withdrawn from between the sheet stack S and the new sheet S'. The sheet stack S falls onto the new sheet S' upon withdrawal of the free belt loops. The feeding of one sheet into the stacking compartment 16 is now completed. The free belt loops subsequently return to the position of FIG. 2A to await the next sheet.

Thus, by the repetition of the above cycle of operation, successive sheets can be stacked up in the stacking compartment 16 as they are supplied to the feed path 14 one by one and with appropriate spacings therebetween. Each new sheet is placed under the preceding sheet in the stacking compartment 16, gradually increasing the height of the stack.

Figure 3:
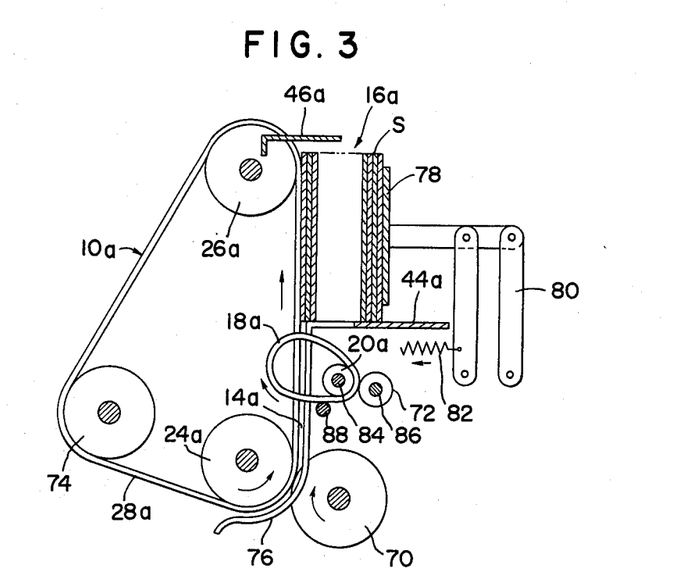
FIG. 3 is a vertical sectional view of another preferred form of the sheet stacking apparatus.

While the apparatus of FIG. 1 stacks sheets vertically, with each sheet in horizontal disposition, the present invention permits horizontal stacking of sheets, with each sheet in vertical disposition, only by slight modification of the FIG. 1 apparatus. FIG. 3 is a schematic representation of such modified apparatus for horizontally stacking sheets. The modified apparatus comprises:

1. a plurality of belt conveyors 10a having span portions extending vertically in side-by-side, coplanar relationship to each other to provide a specific sheet path 14a;

2. a plurality of pressure rolls 70 coacting with the respective belt conveyors 10a, to feed sheets upwardly along the vertical path 14a;

3. a stacking compartment 16a formed on one side of the sheet path 14a for receiving the successive sheets S and accommodating them in the form of a horizontal stack;

4. one or more endless belts 18a loosely engaged about respective pulleys 20a and forming free loops normally crossing the sheet path 14a just under the stacking compartment 16a; and 5. a pressure roll 72 coacting with each pulley 20a to revolve the corresponding one of the endless belts 18a about the pulley.

Each belt conveyor 10a comprises a drive pulley 24a, two idler pulleys 26a and 74, and an endless belt 28a extending around the three pulleys. The pressure rolls 70 are held against the respective conveyor belts 28a extending over the drive pulleys 24a. Formed integrally with a bottom wall 44a of the stacking compartment 16a, sheet guides 76 are disposed to confront the lower portions of the vertical spans of the conveyor belts 28a. Thus, with the rotation of the drive pulleys 24a in the counterclockwise direction, the successive sheets S are fed upwardly along the vertical path 14a as guided by the guides 76.

The stacking compartment 16a comprises the bottom or upstream wall 44a, a top or downstream wall 46a, and a sheet follower 78. The bottom wall 44a serves to support the stack of sheets S thereon. Lying at the downstream end of the vertical sheet path 14a, the top wall 46a functions as a stop for arresting the successive sheets as they are fed fully into the stacking compartment 16a. The sheet follower 78 holds the stack of sheets S upright against the vertical spans of the conveyor belts 28a. The sheet follower 78 is supported by one or more parallel linkages 80 each having a light tension spring 82 biasing the sheet follower toward the conveyor belts 28a. A gradual increase in the thickness of the stack of sheets S causes the sheet follower 78 to move away from the conveyor belts 28a against the bias of the tension spring or springs 82.

Just upstream of, or under, the stacking compartment 16a, the endless belts 18a are loosely wrapped around the pulleys 20a fixedly mounted on a common drive shaft 84, which is assumed to be coupled to a motor drive unit (not shown). A support rod 88 supports the free loops of the endless belts 18a for normally holding them crosswise with the vertical sheet path 14a. The pressure rolls 72 are rotatably mounted on a shaft 86 and frictionally engage the endless belts 18a between themselves and the pulleys 20a. Thus, upon rotation of the drive shaft 84, the pulleys 20a coact with the pressure rolls 72 to impart clockwise rotation to the endless belts 18a.

The operation of this modified sheet stacking apparatus will be apparent from the foregoing description of FIGS. 2A through 2G. It may be worth stating, however, that the force of the tension spring or springs 82 must be sufficiently small to permit the endless belts 18a to move the stack of sheets S away from the conveyor belts 28a during the feeding of each sheet into the stacking compartment 16a.

Figure 4:
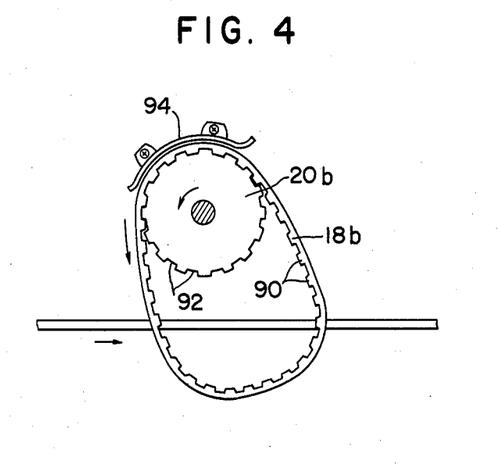
FIG. 4 is an elevational view of a modified endless belt and associated means for use in the apparatus of FIGS. 1 or 3.

FIG. 4 shows a slight modification of the apparatus of FIG. 1. The modification features a toothed belt 18b, known also as a timing belt, used in place of each flat belt 18 in FIG. 1. The toothed endless belt 18b has its internal teeth 90 in engagement with mating grooves 92 in a correspondingly modified pulley 20b. An arcuate guide 94 holds the toothed endless belt 18b in positive engagement with the grooved pulley 20b. By driving the pulley 20b, therefore, the endless belt 18b can be revolved as indicated by the arrow.

It is self-evident that the teachings of FIG. 4 apply to the embodiment of FIG. 3. It will also be understood that round belts, V-belts, or other types of endless belts could be employed in the embodiments of FIGS. 1 and 3.

Figure 5:
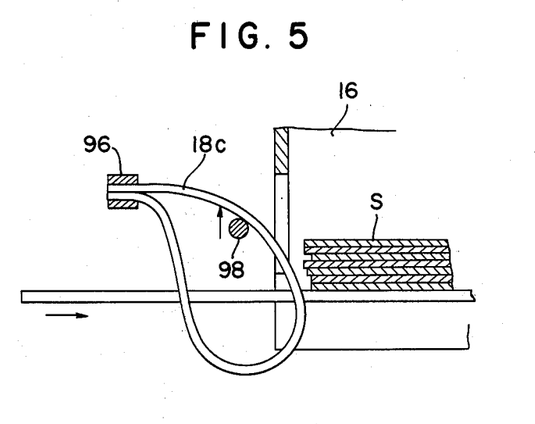
FIG. 5 is a partial, vertical sectional view, partly in elevation, of a modification of the apparatus of FIG. 1.

While all the preceding embodiments employ endless belts, supported for rotation about a fixed point, the present invention also permits the use of nonrotatably supported belts, as embodied in the arrangement of FIG. 5. Each such belt 18c need not be an endless one but may simply be looped by having its opposite ends securely supported as by a clamp 96 immovably mounted in place of, for example, the pulley 20 in the apparatus of FIG. 1. The free loop of the belt 18c normally crosses the predetermined sheet path to the stacking compartment 16. Disposed on the same side of the sheet path as the stacking compartment 16, a pullout rod 98 extends through the free loop of the belt 18c for up-and-down movement with respect to the sheet path.

The looped belt 18c is pressed by each sheet to raise the upstream edge of the stack of sheets S away from the sheet path, as in all the foregoing embodiments. For withdrawal of the free belt loop from between the sheet stack and the sheet just fed into the stacking compartment 16, the pullout rod 98 may be raised away from the sheet path together with the belt loop in engagement therewith, thereby pulling the belt loop out of the stacking compartment 16. The free belt loop will return to the illustrated normal position upon subsequent descent of the pullout rod 98. The teachings of FIG. 5 also apply to the apparatus of FIG. 3.

Although the present invention has been shown and described hereinbefore in terms of its specific embodiments, it will be easy for one skilled in the art to devise a variety of modifications or variations of such embodiments without departing from the scope of the invention. For example, in the apparatus of FIG. 1, the stacking compartment may be formed midway between the extremities of the belt conveyors 10, and the rear wall 46 of the stacking compartment may be supported for movement in the longitudinal direction of the belt conveyors. Each time a preselected number of sheets are stacked in the stacking compartment, its rear wall may be moved toward the downstream end of the belt conveyors thereby permitting the conveyors to transport the stacked batch of sheets.

As has been mentioned, the endless belts 18, 18a and 18b may be in either continuous or intermittent rotation during the operation of the apparatus. In the latter case, moreover, the endless belts may be held in rotation only while they are being withdrawn from between the stack of sheets and each new sheet fed into the stacking compartment.

Further, the part of the sheet path leading to the stacking compartment and the part forming its bottom may be formed by separate belt conveyors or by separate roller conveyors. It is also possible to arrange the bottom of the stacking compartment at a desired angle to the sheet path portion leading to the compartment.

What is claimed is:

1. An apparatus for stacking sheets, such as paper currency, being fed one by one and with spacings therebetween along a prescribed path, comprising:
    (a) means for feeding the successive sheets to be stacked along said path;
    (b) a stacking compartment on said path for receiving the successive sheets and holding same as a stack;
    (c) at least one belt of relatively pliant material disposed immediately upstream of the stacking compartment and supported at a fixed point on the same side of said path as the stacking compartment so as to form a free loop normally crossing said path, the free loop of the belt being capable, when pressed by each sheet traveling along said path, of engaging the upstream edge of the stack of sheets in the stacking compartment and of moving same way from said path, whereby each new sheet is fed to a position between said path and the stack of sheets in the stacking compartment; and
    (d) means for withdrawing the free loop of the belt from between the stack of sheets and each new sheet following the completion of the feeding of the new sheet into the stacking compartment.

2. A sheet stacking apparatus according to claim 1, wherein the belt is an endless belt, and wherein the withdrawing means comprises:
    (a) a pulley rotatably supported at said fixed point and having the endless belt loosely engaged thereabout; and
    (b) means for holding the endless belt in working contact with the pulley and coacting therewith to impart rotation to the endless belt in a prescribed direction.

3. A sheet stacking apparatus according to claim 2, wherein the endless belt has a series of teeth formed on its inside surface, and wherein the pulley has mating grooves for engagement with the teeth of the endless belt.

4. A sheet stacking apparatus according to claim 1, wherein the withdrawing means comprises a pullout member disposed on the same side of said path as the stacking compartment and extending through the free loop of the belt, the pullout member being moved away from said path for withdrawing the free loop from between the stack of sheets and each new sheet fed into the stacking compartment.

5. A sheet stacking apparatus according to claim 1, 2, 3, or 4, wherein said path extends horizontally, and wherein the stacking compartment has a downstream wall for arresting the travel of each sheet when same is fed fully into the stacking compartment.

6. A sheet stacking apparatus according to claim 1, 2, 3 or 4, wherein said path extends vertically, and wherein the apparatus further comprises means for yieldably holding the stack of sheets upright against the feeding means in the stacking compartment.

7. A method of stacking sheets such as paper currency, which comprises:
    (a) providing at least one belt of relatively pliant material immediately upstream of a stacking compartment formed on a prescribed path of travel of the sheets, the belt being supported at a fixed point on the same side of said path as the stacking compartment so as to form a free loop normally crossing said path;
    (b) feeding the sheets one by one and with spacings therebetween along said path toward the stacking compartment, each sheet on its way to the stacking compartment being effective to cause the free loop of the belt to engage the upstream edge of a stack of sheets in the stacking compartment and to move same away from said path, whereby each sheet is fed to a position between said path and the stack of sheets in the stacking compartment; and (c) withdrawing the free loop of the belt from between the stack of sheets and each new sheet following the completion of the feeding of the new sheet into the stacking compartment.

8. A sheet stacking method according to claim 7, wherein the belt is an endless belt, and wherein the endless belt is withdrawn by being rotated in a prescribed direction about the fixed point.

9. A sheet stacking method according to claim 7, wherein the free loop of the belt is withdrawn by being pulled away from the stacking compartment.

* * * * *